United States Patent [19]

Zander et al.

[11] Patent Number: 5,251,838

[45] Date of Patent: Oct. 12, 1993

[54] FILM CASSETTE WITH REMOVABLE END CAP

[75] Inventors: Dennis R. Zander, Penfield; David G. Tomer, Hilton, both of N.Y.

[73] Assignee: Eastman Kodak Company, Rochester, N.Y.

[21] Appl. No.: 655,609

[22] Filed: Feb. 15, 1991

[51] Int. Cl.⁵ .............................................. G03B 17/26
[52] U.S. Cl. .................................... 242/71.1; 354/275
[58] Field of Search .......................... 242/71.1, 71.2; 354/275; 206/409, 413, 414, 415, 416

[56] References Cited

U.S. PATENT DOCUMENTS

| | | |
|---|---|---|
| 2,017,160 | 10/1935 | Parker . |
| 2,176,507 | 10/1939 | Nagel . |
| 3,613,876 | 10/1971 | Kohler ........................ 242/71.1 X |
| 4,071,202 | 1/1978 | Gersch et al. ........................ 242/71.1 |
| 4,682,870 | 7/1987 | Atkinson .............................. 354/275 |
| 4,826,008 | 5/1989 | Cloosterman ....................... 206/415 |

Primary Examiner—John M. Jillions
Attorney, Agent, or Firm—Roger A. Fields

[57] ABSTRACT

A film cassette comprises a cassette shell and a film spool rotatably supported inside the shell. The spool has one end accessible from outside the shell for engagement to rotate the spool. An end cap is sized and shaped to cover the one end of the spool and can be removed from the shell to uncover the one end by pushing against a lip-like portion of the end cap that protrudes from the shell. A tamper-proof label is affixed to the shell and the end cap which is torn along a series of perforations when the end cap is separated from the shell.

8 Claims, 1 Drawing Sheet

FILM CASSETTE WITH REMOVABLE END CAP

BACKGROUND OF THE INVENTION

1. Field of the Invention

The invention relates generally to the field of photography and in particular to film cassettes.

2. Description of the Prior Art

Prior art 35 mm film cassettes, as is well known, comprise a cassette shell and a film spool rotatably supported inside the shell. A roll of unexposed film is coiled about the spool and has one end, i.e. a leader, that protrudes outwardly from a light-tight mouth or slit of the shell. Opposite keyed ends of the spool protrudes from respective light-tight openings in the end faces of the shell to permit the spool to be engaged to wind the 35 mm filmstrip into the shell.

Since the keyed ends of the spool are accessible from outside the shell, one can inadvertently wind the leader into the shell; whereupon, the leader cannot readily be retrieved.

SUMMARY OF THE INVENTION

A film cassette comprises a cassette shell and a film spool rotatably supported inside the shell. The spool has at least one end accessible from outside the shell for engagement to rotate the spool. According to the invention, and end cap (or caps) is sized and cover the accessible end(s) of the spool and can be removed from the shell to uncover the accessible end by pushing against a lip-like portion of the end cap that protrudes from the shell. Preferably, a tamper-proof label is affixed to the shell and the end cap which is torn along a series of perforations when the end cap is separated from the shell.

DETAILED DESCRIPTION OF THE PREFERRED EMBODIMENT

Figure 1:
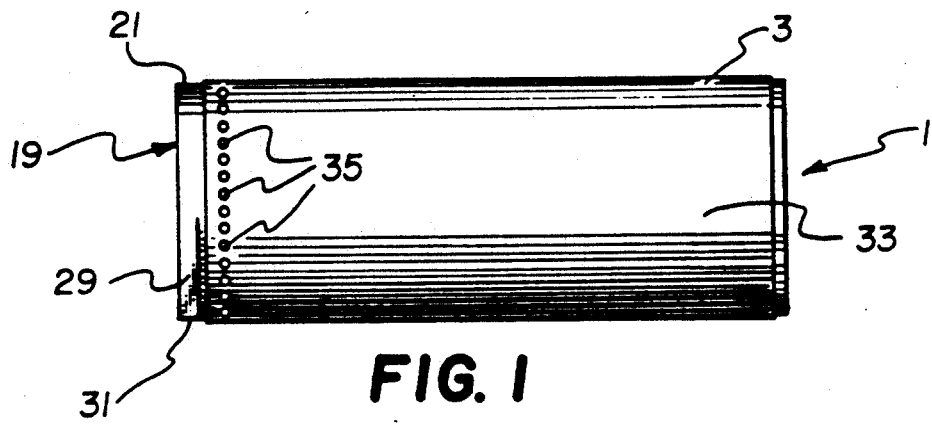
FIG. 1 is a side elevation view of a film cassette with a removable end cap according to a preferred embodiment of the invention.
Figure 2:
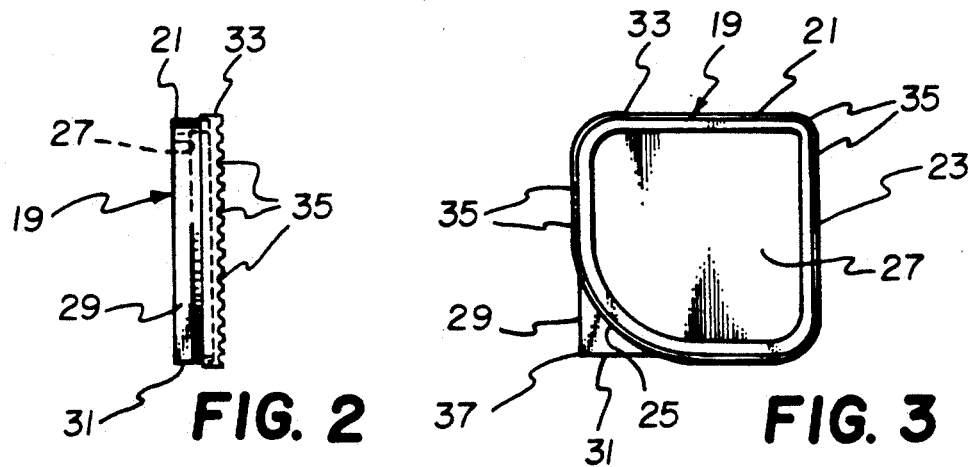
FIG. 2 is a side elevation view of the end cap.
Figure 3:
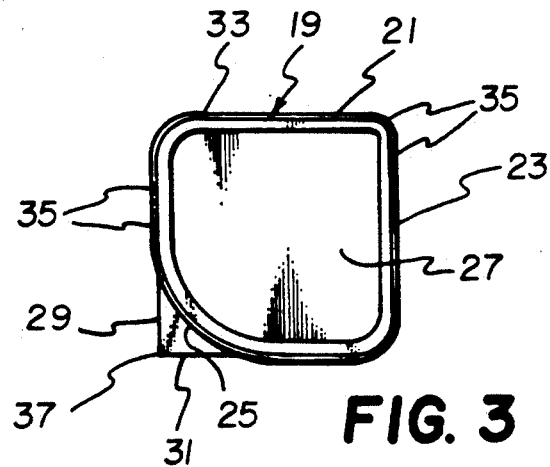
FIG. 3 is a plan view of the end cap as seen from its underside.
Figure 4:
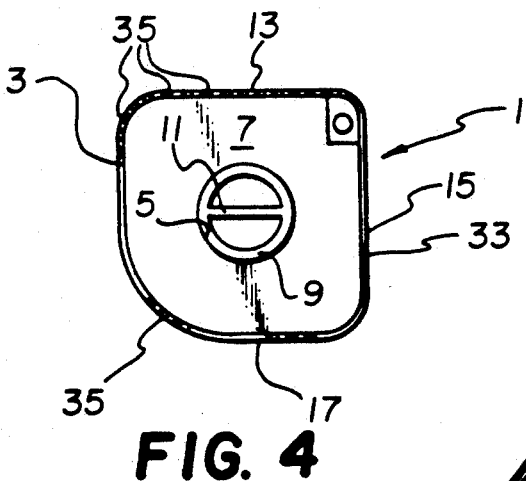
FIG. 4 is an end view of the film cassette shown with the end cap removed.

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Referring now to the drawings, FIGS. 1-4 depict a film cassette 1 which includes a cassette shell 3 having a central opening 5 in an end face 7 of the shell. A film spool 9 is located inside the shell 3. The spool 9 has a keyed end 11 accessible from outside the shell 3 at the central opening 5 for engagement to rotate the spool. See FIG. 4. The shell 3 includes a pair of contiguous planar sides 13 and 15 and a third arcuate side 17 adjoining the respective planar sides. An end cap 19 for covering the end face 7 of the shell 3 is rectangular in shape and includes a pair of contiguous planar sides 21 and 23 and a third arcuate side 25 adjoining the respective planar sides. The three sides 21, 23 and 25 of the end cap 19 define a recess or cavity 27 which snugly partly receives the three sides 13, 15 and 17 of the shell 3, in a corresponding orientation, to secure the end cap removably to the shell, with the end cap covering the end face 7 of the shell. See FIGS. 2-4. When the end cap 19 covers the end face 7 of the shell 3, a second pair of contiguous planar sides (or edges) 29 and 31 of the end cap extend substantially tangent to the arcuate side 17 of the shell and the first pair of planar sides 21 and 23 of the end cap are aligned substantially with the respective planar sides 13 and 15 of the shell. This enables the end cap 19 to steady the shell 3, i.e. stop it from rolling, should it be laid on its arcuate side 17.

A paper label 33 is affixed to the shell 3 and the end cap 19 to hold the two together. See FIGS. 1-4. The label 33 includes a series of perforations 35 along which it is torn when the end cap 19 is separated from the shell 3. This serves as a visible indication that the end cap 19 was removed from the shell 3. The second pair of planar sides 29 and 31 of the end cap 19 are adjoined at a corner portion 37 of the end cap to form a lip that projects from the arcuate side 31 of the end cap which can be pushed away from the shell 3, when the end cap is secured to the shell, to tear the label 3 along the perforations 35. See FIG. 3.

Figure 5:
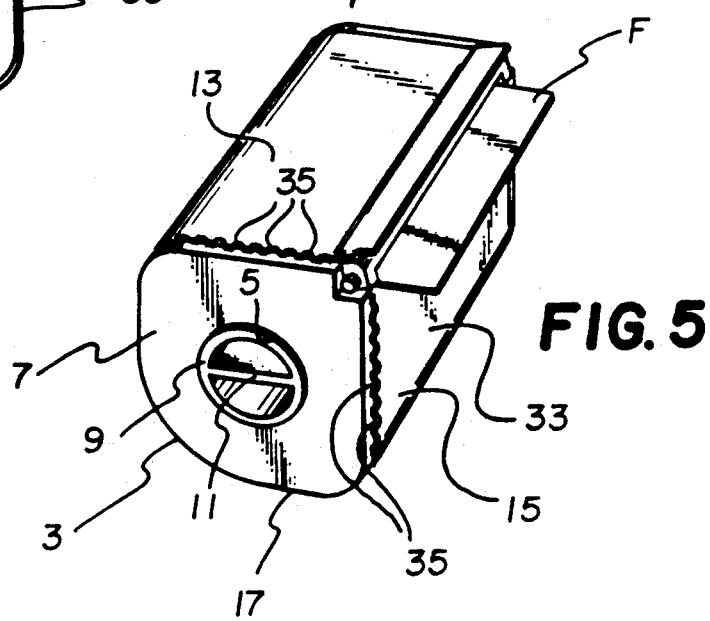
FIG. 5 is a perspective view of the film cassette as in FIG. 4, but with the cassette shell opened to unload a filmstrip normally coiled inside the film cassette.

When the end cap 19 is removed from the shell 3 as shown in FIG. 5, the planar side 13 of the shell may be pried, flexed or pivoted open to remove a filmstrip F coiled about the spool 9. A similar arrangement is shown in prior art U.S. Pat. No. 4,962,401, issued Oct. 9, 1990.

The invention has been described with reference to a preferred embodiment. However, it will be appreciated that variations and modifications can be effected within the ordinary skill in the art without departing from the scope of the invention.

We claim:

1. A film cassette comprising a cassette shell, and a film spool located inside said shell and having one end accessible from outside the shell for engagement to rotate said spool, is characterized in that:

an end cap is sized and shaped to cover said one end of the spool and includes securement means for securing said end cap to said shell, with the end cap covering the one end, and for permitting removal of the end cap from the shell to uncover the one end.

2. A film cassette as recited in claim 1, further characterized in that:

frangible means is affixed to said shell and said end cap for holding the shell and the end cap together and can be torn to separate the end cap from the shell.

3. A film cassette as recited in claim 2, wherein said frangible means is a paper label having a weakened section located between said shell and said end cap that will be torn when one attempts to separate the end cap from the shell.

4. A film cassette as recited in claim 3, wherein said shell includes a pair of contiguous planar sides and a third arcuate side adjoining said respective planar sides, and said end cap is rectangular in shape and includes a first pair of contiguous planar sides aligned substantially with said respective planar sides of the shell and a second pair of contiguous planar sides extending substantially tangent to said arcuate side of the shell when the end cap is secured to the shell.

5. A film cassette as recited in claim 4, wherein said second pair of planar sides of the end cap are adjoined at a corner portion of said end cap to form a lip that projects from said arcuate side of the shell when the end cap is secured to the shell which can be pushed away from the shell to tear said label along said weakened section.

6. A film cassette as recited in claim 1, wherein said shell includes a pair of contiguous planar sides and a third arcuate side adjoining said respective planar sides, and said end cap includes a pair of contiguous planar sides extending substantially tangent to said arcuate side of the shell when the end cap is secured to the shell to steady the shell should it be laid on the arcuate side.

7. A film cassette as recited in claim 6, wherein said second pair of planar sides of the end cap are adjoined at a corner portion of said end cap to form a lip that projects from said arcuate side of the shell when the end cap is secured to the shell which can be pushed away from the shell to facilitate removal of the end cap from the shell.

8. A film cassette comprising a cassette shell having central opening in an end face of said shell, and a film spool located inside said shell and having one end accessible from outside the shell at said central opening for engagement to rotate said spool, is characterized in that;
   an end cap is sized and shaped to cover said end face of the shell to conceal said one end of the spool and to permit removal of the end cap from the shell to expose the one end; and
   indicator means is affixed to said shell and said end cap for visibly indicating the end cap was removed from the shell at least one time.

* * * * *